Dec. 10, 1935.  A. HORNER  2,023,810
METHOD OF CUTTING PINEAPPLE IN PREPARATION FOR CANNING
Filed Feb. 24, 1934
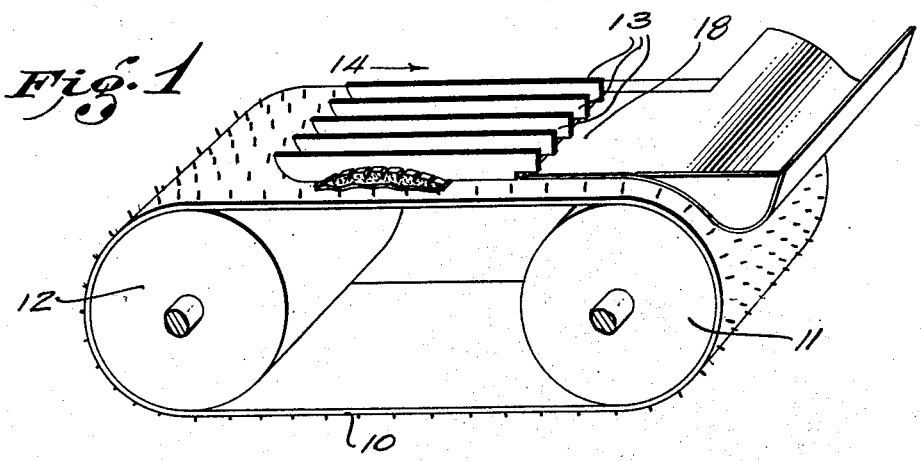
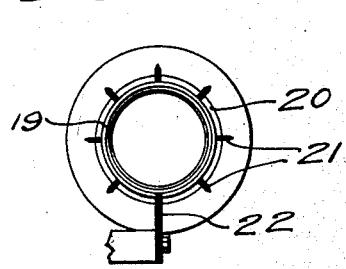
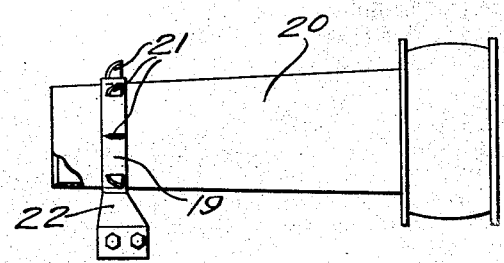
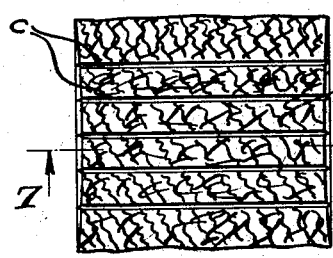
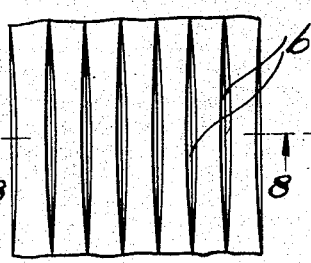
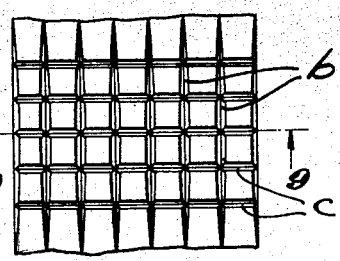
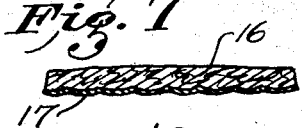
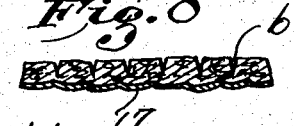
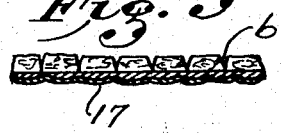
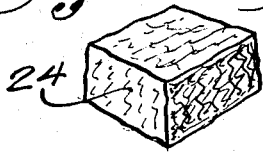
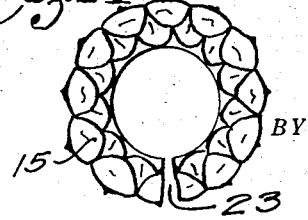
INVENTOR
ALBERT HORNER
BY James M. Abbott
ATTORNEY Patented Dec. 10, 1935

2,023,810

UNITED STATES PATENT OFFICE 2,023,810

METHOD OF CUTTING PINEAPPLE IN PREPARATION FOR CANNING

Albert Horner, Kapaa, Kauai, Territory of Hawaii, assignor to Hawaiian Canneries Company, Ltd., Kapaa, Kauai, Territory of Hawaii Application February 24, 1934, Serial No. 712,779

4 Claims. (Cl. 146—219)

This invention relates to a method and means for treating pineapple and particularly pertains to an improved method and means for cutting pineapple in preparation for canning.

The first operation generally employed in preparing pineapples for canning is to pass the fruit through a machine known as a Ginaca machine, and attached devices which perform the following operations: The fruit has the ends cut off, the core removed, a cylinder of correct diameter to fit a can is cut longitudinally out of the center of the fruit and is routed into the cannery, and the remaining edible meat attached to the peel is planed off to become what is commercially known as "crushed pineapple". Crushed pineapple has relatively small commercial value due to the size, shapes and condition of the fragments or pieces of which it is composed, and it is the principal object of the present invention to provide a method and means of cutting and preparing the pineapple of which crushed pineapple is usually made so that the pineapple may be removed from the peel in pieces of substantially uniform size, sightly appearance, and in a more edible condition than is now the custom.

The present invention contemplates the provision of means acting to score, cut and otherwise act upon that portion of pineapple meat usually associated with the removed portion of the pineapple peel to separate the same therefrom in pieces of substantially uniform predetermined size and shape.

The invention is illustrated by way of example in the accompanying drawing, in which:—

Figure 1 is a view in perspective showing the mechanism on which the pineapple meat is finally separated from slices of the peel.

Fig. 2 is a view in end elevation showing the cutting device by which the peel is removed from the pineapple and scored.

Fig. 3 is a view in side elevation showing the cutting device.

Fig. 4 is a view in plan showing the usual random manner in which the pineapple meat breaks from the peel.

Fig. 5 is a view in plan showing the initial scoring made by the cutter of Fig. 2.

Fig. 6 is a view in plan showing the completely scored pineapple meat.

Fig. 7 is a view in transverse section as seen on the line 7—7 of Fig. 4.

Fig. 8 is a view in transverse section as seen on the line 8—8 of Fig. 5.

Fig. 9 is a view in transverse section as seen on the line 9—9 of Fig. 6.

Fig. 10 is a view in perspective showing the final product.

Fig. 11 is a view in end elevation showing the pineapple peel as severed by the slitting knife.

The device usually employed to remove the meat from the peel is called a "sheller". The usual form of this device, as shown in Fig. 1 of the drawing, consists of a nail studded belt 10 between two pulleys 11 and 12, above which are a series of vertical cutting fins 13, parallel to each other, and extending in the direction of belt travel 14.

The peel with the meat, as shown in Figs. 3 and 4, and indicated by the numeral 15 is carried by the nail studded belt 10 against and under the fins 13 with the fins flattening the peel against the belt by extending through the soft meat 16, to the tough peel 17. When the peel is flattened and the meat is projected upward between the fins 13 a slitting knife 18 disposed in a parallel plane to that of the upper run of the belt and a correct distance above it. The knife 18 is disposed across the path of travel of the pineapple meat 16, severing it from the peel 17. This severed meat falls apart in small pieces and becomes crushed. In usual methods, this meat breaks into pieces at random along irregular lines, as indicated at "a" in Fig. 4.

It is the purpose of this invention to keep the meat from falling apart into small or irregular shaped pieces, and to cut it into approximate squares, or other quadrilateral shapes which can be canned and sold at a higher price than crushed pineapple.

To effect this result a flat ring 19 is placed in an embracing position around a revolving cylindrical knife 20, usually employed to cut the center cylinder from the fruit. On the outside of the ring are placed small blades 21 at suitable spaced intervals, which project radially from the ring. The ring is also provided with a peel splitting blade 22 by which the ring is supported in a fixed position near the outer end of the cutter, and through which the cutter rotates.

The fruit in passing through the revolving cylindrical knife 20 is divided into the center cylinder (not shown) and the peel 15 carrying the meat 16. In passing over the small blades and onto the cutter 20 the meat is scored by the blades 21 in longitudinal lines "b", and the peel is split at 23. When now the peel is flattened by the aforementioned "sheller" the meat 16 instead of separating into innumerable small divisions "a", divides along the longitudinal lines cut into it by the blades 21 on the ring 19. The fins 13 on the sheller now cut into the meat along lines "c" at right angles to the lines cut by the ring blades, as the pieces are fed by the belt 10, dividing the meat attached to the peel into quadrilaterals being approximate squares 24. When the meat now passes beneath the diagonal splitting knife 18, these squares are severed as approximate squares 24, instead of irregular pieces commonly known to the trade as "crushed".

Means already exist for passing the peel from one operation to another. The novelty in this invention lying in that in following its usual route over the cylindrical cutter 20, it must pass over the ring 19, and its blades 21 and receive the above described longitudinal scoring lines "b" cut into the meat 16 of the peel section.

It will thus be seen that the method and means here shown insures that the pineapple meat usually recovered from the removed peel, may be caused to assume regular shapes of determined form, as compared to the irregular pieces now obtained due to the random cracking and breaking of the meat as it passes through the sheller.

While I have shown the preferred form of apparatus and method of practicing said invention, it will be understood that various changes may be made in the combination of parts and the steps of the invention by those skilled in the art without departing from the spirit of the invention.

Having thus described my invention, what I claim and desire to secure by Letters Patent is:—

1. A method of treating pineapple which consists in removing sections of pineapple peel and an associated thickness of pineapple meat from a pineapple, forming parallel longitudinal scoring lines in the surface of the meat of the pineapple which was removed with the peel, thereafter forming transverse scoring lines in the surface of said meat whereby said surface will be divided into a plurality of quadrilateral fields, and then severing the meat from the peel in a plane lengthwise of the peel whereby a plurality of separate quadrilateral pieces of pineapple meat will be formed.

2. A method of treating pineapple which consists in removing the peel from the pineapple in a section substantially representing the developed circumferential surface of the pineapple, forming parallel longitudinal scoring lines in the surface of the meat of the pineapple which was removed with the peel, thereafter forming transverse scoring lines in the surface of the meat of the pineapple, whereby said surface will be subdivided into a plurality of quadrilateral fields, and then severing the meat from the peel in a plane lengthwise of the peel whereby a plurality of separate quadrilateral pieces of pineapple meat will be found.

3. A method of treating pineapple which consists in removing the peel from the pineapple in a section substantially representing the developed circumferential surface thereof, forming parallel scoring lines across the surface of the meat of the pineapple and longitudinally thereof, unrolling said peel to cause it to lie flat, thereafter forming a plurality of parallel lines across the surface of the pineapple at an angle to the lines previously formed, whereby the surface of the pineapple will be scored to form fields of uniform configuration, then severing the meat of the pineapple from the peel in a plane lengthwise thereof whereby a plurality of separate pieces of pineapple of substantially uniform configuration will be obtained.

4. A method of treating pineapple peel to obtain unbroken pieces of pineapple normally associated therewith after a core of meat has been removed, which consists in forming a plurality of longitudinal serrations in the peel simultaneously with the separation of a cylindrical core of meat from the peel and simultaneously splitting the peel longitudinally incident thereto, thereafter laying the peel flat with the meat portion presented upwardly and then forming a plurality of parallel serrations in the meat portion transversely of the longitudinal serrations previously formed whereby the meat associated with the peel will be subdivided into a plurality of rectilinear portions associated with the peel and then severing the meat from the peel to produce a plurality of rectilinear pieces of pineapple meat.

ALBERT HORNER.